(12) United States Patent
Ohara et al.

(10) Patent No.: US 8,977,120 B2
(45) Date of Patent: Mar. 10, 2015

(54) CLIENT SIGNAL ACCOMMODATING MULTIPLEXING APPARATUS AND METHOD

(75) Inventors: Takuya Ohara, Yokosuka (JP); Takashi Ono, Yokosuka (JP); Shigeki Aisawa, Yokosuka (JP); Masahito Tomizawa, Yokosuka (JP); Hiroyuki Honma, Kawasaki (JP); Satoru Saitoh, Kawasaki (JP); Masahiro Shioda, Kawasaki (JP)

(73) Assignees: Nippon Telegraph and Telephone Corporation, Tokyo (JP); Fujitsu Limited, Kawasaki-shi (JP)

( * ) Notice: Subject to any disclaimer, the term of this patent is extended or adjusted under 35 U.S.C. 154(b) by 192 days.

(21) Appl. No.: 13/634,033

(22) PCT Filed: Mar. 11, 2011

(86) PCT No.: PCT/JP2011/055839
§ 371 (c)(1),
(2), (4) Date: Sep. 11, 2012

(87) PCT Pub. No.: WO2011/111839
PCT Pub. Date: Sep. 15, 2011

(65) Prior Publication Data
US 2013/0004168 A1    Jan. 3, 2013

(30) Foreign Application Priority Data
Mar. 12, 2010    (JP) .................................. 2010-056269

(51) Int. Cl.
*H04J 14/00* (2006.01)
*H04J 3/16* (2006.01)
*H04J 3/06* (2006.01)

(52) U.S. Cl.
CPC .............. *H04J 3/1658* (2013.01); *H04J 3/0638* (2013.01)
USPC .................................. 398/43; 398/52; 398/71

(58) Field of Classification Search
USPC ........................................ 398/43, 52, 71, 154
See application file for complete search history.

(56) References Cited

U.S. PATENT DOCUMENTS

| 7,970,008 B2 | 6/2011 | Kisaka et al. |
| 2004/0114638 A1 | 6/2004 | Matsuura et al. |

(Continued)

FOREIGN PATENT DOCUMENTS

| WO | 02 067508 | 8/2002 |
| WO | 2008 087975 | 7/2008 |
| WO | 2009 090777 | 7/2009 |

OTHER PUBLICATIONS

ITU-T International Telecommunication Union, "Interfaces for Optical Transport Network (OTN)," ITU-T Recommendation G.709/Y. 1331, Total 117 Pages, (Mar. 2003).

(Continued)

*Primary Examiner* — Dzung Tran
(74) *Attorney, Agent, or Firm* — Oblon, McClelland, Maier & Neustadt, L.L.P.

(57) ABSTRACT

In an apparatus for accommodating and multiplexing asynchronous client signals in which an idle signal is defined, the transmission side transmits client signals after synchronizing the client signals by inserting or removing, with reference to a specific client signal, an idle signal to/from the same type of another client signal, and in the receiving side, a PLL part is shared by recovering a clock from a client signal and distributing the clock for another client signal.

8 Claims, 6 Drawing Sheets

(56) References Cited

U.S. PATENT DOCUMENTS

| | | | |
|---|---|---|---|
| 2007/0071443 A1* | 3/2007 | Fukumitsu et al. | 398/79 |
| 2007/0248121 A1* | 10/2007 | Zou | 370/498 |
| 2010/0080245 A1 | 4/2010 | Kisaka et al. | |
| 2010/0226652 A1* | 9/2010 | Vissers et al. | 398/98 |
| 2010/0303464 A1* | 12/2010 | Dong et al. | 398/98 |
| 2011/0135304 A1* | 6/2011 | Katagiri et al. | 398/45 |

OTHER PUBLICATIONS

"Interfaces for the Optical Transport Network (OTN)," ITU-T Recommendation G.709N.1331, Amendment 3, Total 64 Pages, (Apr. 2009).

International Search Report Issued May 31, 2011 in PCT/JP11/055839 Filed Mar. 11, 2011.

* cited by examiner

CLIENT SIGNAL ACCOMMODATING MULTIPLEXING APPARATUS AND METHOD

TECHNICAL FIELD

The present invention relates to a client signal accommodating and multiplexing apparatus and the method. In particular, the present invention relates to a client signal accommodating and multiplexing apparatus and the method for performing wide area transmission of various client signals including an Ethernet signal with high reliability.

BACKGROUND ART

Use of the Ethernet has been spreading with explosion of the Internet traffic. As to the Ethernet which is internationally standardized in the IEEE, the communication speed has been increasing from 10M initially to 100M, 1G and to 10G. The transmission distance of the Ethernet is 40 km at most. Thus, long distance transmission is not available by itself. OTN (Optical Transport Network) defined by ITU-T is an international standard technique for performing wide area transmission of various client signals including the Ethernet with high reliability (refer to the non-patent document 1, for example). By accommodating the Ethernet to the OTN, it becomes possible to perform long distance transmission exceeding 40 km.

FIG. 6 is a block diagram of a conventional technique for multiplexing a plurality of client signals to the OTN. In FIG. 6, each of the shaded areas indicates an independent clock domain. The client signal accommodating and multiplexing apparatus shown in the figure includes an OTN transmission side (upper part of the figure) and an OTN receiving side (lower part of the figure). The OTN transmission side includes a plurality of client signal receiving parts 11, accommodation parts 12 each being connected to the client receiving part 11, a multiplexing part 13, a framer part 14, an OTN signal transmission part 15. The OTN receiving side includes an OTN signal receiving part 16, a framer part 17, a separation part 18, a plurality of restoration parts 20, a plurality of PLL (Phase Locked Loop) parts 19 each being connected to the restoration part 20, and a plurality of client signal transmission parts 21 each being connected to the restoration part 20.

O/E conversion is performed on the client signal such as the Ethernet signal by the client signal receiving part 11. After that, the client signal is mapped to an ODU suitable for respective client signals by the accommodation part 12, and further the ODU is mapped to the ODTU. BMP (Bit-synchronous Mapping Procedure), AMP (Asynchronous Mapping Procedure), GMP (Generic Mapping Procedure) or the like is used for the mapping of the client signal to the ODU. Also, AMP, GMP or the like is used for mapping of the ODU to the ODTU. The multiplexing part 13 multiplexes a plurality of ODTUs into an upper ODU. Then, the framer part 14 performs overhead processing and adds error correction code so as to generate an OTU signal. Finally, the OTN signal transmission part 15 generates an optical transmission signal and transmits it. In the receiving side of the OTN signal, an OTU signal is obtained by performing O/E conversion on a signal received by the OTN signal receiving part 16. The framer part 17 performs overhead processing and decoding of the error correction code for the OTU signal so as to send an ODU signal to the separation part 18. Next, the separation part 18 separates the ODU signal into a plurality of ODTU signals. The separated ODTU signal is de-mapped by the restoration part 20 to generate an ODU signal, and the ODU signal is de-mapped to the client signal. The client signal transmission part 21 performs E/O conversion on the client signal and transmits it.

In recent years, along with the popularization of the Ethernet, the OTN standard has been largely expanded to weigh heavily on the Ethernet transfer (refer to non-patent document 2, for example). More particularly, ODU0 for accommodating GbE and ODU2e for accommodating 10 GbE are defined, as new ODUs (Optical Channel Data Unit). By multiplexing these ODUs to an upper ODU (ODU3, ODU4, for example), it becomes possible to perform economic wide area transfer of the Ethernet.

RELATED ART DOCUMENT

[Non-Patent document 1] "Interfaces for the Optical Transport Network (OTN)", ITU-T Recommendation G.709/Y.1331 (03/2003).

[Non-Patent document 2] "Interfaces for the Optical Transport Network (OTN)", ITU-T Recommendation G.709/Y.1331 Amendment 3 (04/2009).

SUMMARY OF THE INVENTION

Problem to be Solved by the Invention

However, in the above-mentioned conventional technique, there is a problem in that the size of equipment becomes large for accommodating many client signals such as the Ethernet into the OTN and transferring the signals by multiplexing them. For example, in a case of accommodating 10 GbE into ODU2e and multiplexing ODU2es to the ODU4 for transmission, 10 ODU2es can be multiplexed to the ODU4 at the maximum. Also, in a case of accommodating GbE into ODU0 and multiplexing ODU0s to the ODU4 for transmission, 80 ODU0s can be multiplexed to the ODU4 at the maximum. Accordingly, in order to multiplex many client signals, the number of function blocks the same as the number of multiplexing become necessary.

Regarding clock recovery in the receiving side of FIG. 6 of the above-mentioned conventional technique, even if the same type of client signals are multiplexed and transmitted, since respective clocks of the client signals are independent with each other, it is necessary to provide the PLL part 19, for performing clock recovering, adjacent to each restoration part 20. In the case when multiplexing 80 GbEs (ODU0s), 80 PLL parts are necessary. In the case when multiplexing 10 10 GbEs (ODU2es), 10 PLL parts are necessary. Thus, the circuit size becomes large.

The present invention is contrived in view of the above-mentioned problem, and an object of the present invention is to provide a client signal accommodating and multiplexing apparatus, and the method that can decrease the circuit size of an OTN apparatus for multiplexing and transmitting client signals such as the Ethernet.

Means for Solving the Problem

In order to achieve the object, the present invention is configured as a client signal accommodating and multiplexing apparatus comprising:

a transmission side OTN apparatus that comprises:
client signal receiving units each of which is configured to receive a client signal;
accommodation units each of which is configured to map the client signal to an ODU signal and maps the ODU signal to an ODTU signal;

a multiplexing unit configured to multiplex a plurality of ODTU signals;
a first framer unit configured to generate an OTU signal; and
an OTN signal transmission unit configured to generate an optical transmission signal, and
a receiving side OTN apparatus that comprises:
an OTN signal receiving unit configured to receive an optical transmission signal;
a second framer unit configured to terminate an OTU signal;
a separation unit configured to separate to a plurality of ODTU signals;
restoration units each of which is configured to de-map an ODU signal from the ODTU signal, and to de-map a client signal from the ODU signal; and
client signal transmission units each of which is configured to transmit the restored client signal,
wherein, in the transmission side OTN apparatus, an idle insertion and removal unit is connected between the client signal receiving unit and the accommodation unit, the idle insertion and removal unit being configured to synchronize client signals by inserting or removing, based on a clock of a first client signal, an idle signal to/from another client signal, and
in the receiving side OTN apparatus, a PLL (Phase Locked Loop) unit is connected, the PLL unit being configured to recover a clock of the client signal based on clocks and mapping information of the ODTU signal and the ODU signal in a first restoration unit and to distribute the clock to the restoration units.

The present invention may be also configured as a client signal accommodating and multiplexing apparatus comprising:
a transmission side OTN apparatus that comprises:
client signal receiving units each of which is configured to receive a client signal;
accommodation units each of which is configured to map the client signal to an ODU signal and maps the ODU signal to an ODTU signal;
a multiplexing unit configured to multiplex a plurality of ODTU signals;
a first framer unit configured to generate an OTU signal; and
an OTN signal transmission unit configured to generate an optical transmission signal, and
a receiving side OTN apparatus that comprises:
an OTN signal receiving unit configured to receive an optical transmission signal;
a second framer unit configured to terminate an OTU signal;
a separation unit configured to separate to a plurality of ODTU signals;
restoration units each of which is configured to de-map an ODU signal from the ODTU signal, and to de-map a client signal from the ODU signal; and
client signal transmission units each of which is configured to transmit the restored client signal,
wherein, in the transmission side OTN apparatus, an idle insertion and removal unit is connected between the client signal receiving unit and the accommodation unit, the idle insertion and removal unit being configured to synchronize client signals by inserting or removing an idle signal to/from the client signals based on a local clock and a clock output from the local clock, and
in the receiving side OTN apparatus, a PLL unit is connected, the PLL unit being configured to recover a clock of the client signal based on clocks and mapping information of the ODTU signal and the ODU signal in a first restoration unit and to distribute the clock to the restoration units.

The present invention may be also configured as a client signal accommodating and multiplexing apparatus comprising:
a transmission side OTN apparatus that comprises:
client signal receiving units each of which is configured to receive a client signal;
accommodation units each of which is configured to map the client signal to an ODU signal and maps the ODU signal to an ODTU signal;
a multiplexing unit configured to multiplex a plurality of ODTU signals;
a first framer unit configured to generate an OTU signal; and
an OTN signal transmission unit configured to generate an optical transmission signal, and
a receiving side OTN apparatus that comprises:
an OTN signal receiving unit configured to receive an optical transmission signal;
a second framer unit configured to terminate an OTU signal;
a separation unit configured to separate to a plurality of ODTU signals;
restoration units each of which is configured to de-map an ODU signal from the ODTU signal, and to de-map a client signal from the ODU signal; and
client signal transmission units each of which is configured to transmit the restored client signal,
wherein, in the receiving side OTN apparatus, a PLL unit is connected, the PLL unit being configured to recover a clock of the client signal based on clocks and mapping information of the ODTU signal and the ODU signal in a first restoration unit and, to distribute the clock to the first restoration unit and to an idle insertion and removal unit that is placed after the other restoration units, the idle insertion and removal unit being configured to synchronize client signals by inserting or removing an idle signal to/from the client signals.

The present invention may be also configured as a client signal accommodating and multiplexing apparatus comprising:
a transmission side OTN apparatus that comprises:
client signal receiving units each of which is configured to receive a client signal;
accommodation units each of which is configured to map the client signal to an ODU signal and maps the ODU signal to an ODTU signal;
a multiplexing unit configured to multiplex a plurality of ODTU signals;
a first framer unit configured to generate an OTU signal; and
an OTN signal transmission unit configured to generate an optical transmission signal, and
a receiving side OTN apparatus that comprises:
an OTN signal receiving unit configured to receive an optical transmission signal;
a second framer unit configured to terminate an OTU signal;
a separation unit configured to separate to a plurality of ODTU signals;
restoration units each of which is configured to de-map an ODU signal from the ODTU signal, and to de-map a client signal from the ODU signal; and
client signal transmission units each of which is configured to transmit the restored client signal, wherein, in the receiving side OTN apparatus, an idle insertion and removal unit is connected between the restoration unit and the client signal transmission unit, the idle insertion and removal unit being configured to synchronize client signals by inserting or removing an idle signal to/from the client signals based on a local clock and a clock output from the local clock.

The present invention may be also configured as a client signal accommodating and multiplexing method in an apparatus comprising:
a transmission side OTN apparatus that comprises:
client signal receiving units each of which is configured to receive a client signal;
accommodation units each of which is configured to map the client signal to an ODU signal and maps the ODU signal to an ODTU signal;
a multiplexing unit configured to multiplex a plurality of ODTU signals;
a first framer unit configured to generate an OTU signal; and
an OTN signal transmission unit configured to generate an optical transmission signal, and
a receiving side OTN apparatus that comprises:
an OTN signal receiving unit configured to receive an optical transmission signal;
a second framer unit configured to terminate an OTU signal;
a separation unit configured to separate to a plurality of ODTU signals;
restoration units each of which is configured to de-map an ODU signal from the ODTU signal, and to de-map a client signal from the ODU signal; and
client signal transmission units each of which is configured to transmit the restored client signal,
wherein, in the transmission side OTN apparatus, an idle insertion and removal unit is connected between the client signal receiving unit and the accommodation unit, the idle insertion and removal synchronizes client signals by inserting or removing, based on a clock of a first client signal, an idle signal to/from another client signal, and
in the receiving side OTN apparatus, a PLL unit is connected to the restoration unit, the PLL unit recovers a clock of the client signal based on clocks and mapping information of the ODTU signal and the ODU signal in a first restoration unit and distributes the clock to the restoration units.

The present invention may be also configured as a client signal accommodating and multiplexing method in an apparatus comprising:
a transmission side OTN apparatus that comprises:
client signal receiving units each of which is configured to receive a client signal;
accommodation units each of which is configured to map the client signal to an ODU signal and maps the ODU signal to an ODTU signal;
a multiplexing unit configured to multiplex a plurality of ODTU signals;
a first framer unit configured to generate an OTU signal; and
an OTN signal transmission unit configured to generate an optical transmission signal, and
a receiving side OTN apparatus that comprises:
an OTN signal receiving unit configured to receive an optical transmission signal;
a second framer unit configured to terminate an OTU signal;
a separation unit configured to separate to a plurality of ODTU signals;
restoration units each of which is configured to de-map an ODU signal from the ODTU signal, and to de-map a client signal from the ODU signal; and
client signal transmission units each of which is configured to transmit the restored client signal,
wherein, in the transmission side OTN apparatus, an idle insertion and removal unit is connected between the client signal receiving unit and the accommodation unit, the idle insertion and removal unit synchronizes client signals by inserting or removing an idle signal to/from the client signals based on a local clock and a clock output from the local clock, and
in the receiving side OTN apparatus, a PLL unit for distributing a clock to the restoration units is connected, the PLL unit recovers the clock of the client signal based on clocks and mapping information of the ODTU signal and the ODU signal in a first restoration unit.

The present invention may be also configured as a client signal accommodating and multiplexing method in an apparatus comprising:
a transmission side OTN apparatus that comprises:
client signal receiving units each of which is configured to receive a client signal;
accommodation units each of which is configured to map the client signal to an ODU signal and maps the ODU signal to an ODTU signal;
a multiplexing unit configured to multiplex a plurality of ODTU signals;
a first framer unit configured to generate an OTU signal; and
an OTN signal transmission unit configured to generate an optical transmission signal, and
a receiving side OTN apparatus that comprises:
an OTN signal receiving unit configured to receive an optical transmission signal;
a second framer unit configured to terminate an OTU signal;
a separation unit configured to separate to a plurality of ODTU signals;
restoration units each of which is configured to de-map an ODU signal from the ODTU signal, and to de-map a client signal from the ODU signal; and
client signal transmission units each of which is configured to transmit the restored client signal,
wherein, in the receiving side OTN apparatus, a PLL unit is connected to a first restoration unit, and an idle insertion unit is connected after restoration units other than the first restoration unit,
the PLL unit recovers a clock of the client signal based on clocks and mapping information of the ODTU signal and the ODU signal in the first restoration unit and, distributes the clock to the first restoration unit and to the idle insertion and removal unit that is placed after the other restoration units, and
the idle insertion and removal unit synchronizes client signals by inserting or removing an idle signal to/from the client signals using the clock.

The present invention may be also configured as a client signal accommodating and multiplexing method in an apparatus comprising:
a transmission side OTN apparatus that comprises:
client signal receiving units each of which is configured to receive a client signal;
accommodation units each of which is configured to map the client signal to an ODU signal and maps the ODU signal to an ODTU signal;

a multiplexing unit configured to multiplex a plurality of ODTU signals;
a first framer unit configured to generate an OTU signal; and
an OTN signal transmission unit configured to generate an optical transmission signal, and
a receiving side OTN apparatus that comprises:
an OTN signal receiving unit configured to receive an optical transmission signal;
a second framer unit configured to terminate an OTU signal;
a separation unit configured to separate to a plurality of ODTU signals;
restoration units each of which is configured to de-map an ODU signal from the ODTU signal, and to de-map a client signal from the ODU signal; and
client signal transmission units each of which is configured to transmit the restored client signal,
wherein, in the receiving side OTN apparatus, an idle insertion and removal unit is connected between the restoration unit and the client signal transmission unit, the idle insertion and removal unit synchronizes client signals by inserting or removing an idle signal to/from the client signals based on a clock output from a local clock.

Effect of the Present Invention

As mentioned above, according to the present invention, the clocks of client signals can be synchronized with each other by inserting or removing an idle signal of the client signals, so that a PLL can be shard and the increase of apparatus size can be suppressed.

A bit rate is defined for each client signal such as the Ethernet. For example, the bit rate is 1.25 Gb/s±100 ppm for GbE, and is 10.3125 Gb/s±100 ppm for 10 GbE. However, clocks of client signals transmitted to the OTN apparatus from respective client apparatuses are independent with each other even though the type of the client signals is the same, and the clocks become different with each other within a range of the bit rate definition, in general. In addition, the bit rate changes momentarily even in a client signal sent from the same apparatus. It becomes possible to share the PLL by synchronizing client signals by inserting or removing an idle signal to/from such client signals.

EMBODIMENTS FOR CARRYING OUT THE INVENTION

In the following, embodiments of the present invention are described with reference to figures.

[Principle Configuration]

A principle configuration of a client signal accommodating and multiplexing apparatus in an embodiment of the present invention is described with reference to FIG. 1. In the figure, each dashed area indicates one clock domain (each area is operating based on a respective reference oscillator). That is, in the figure, dashed areas indicate independent clock domains respectively.

Figure 1:
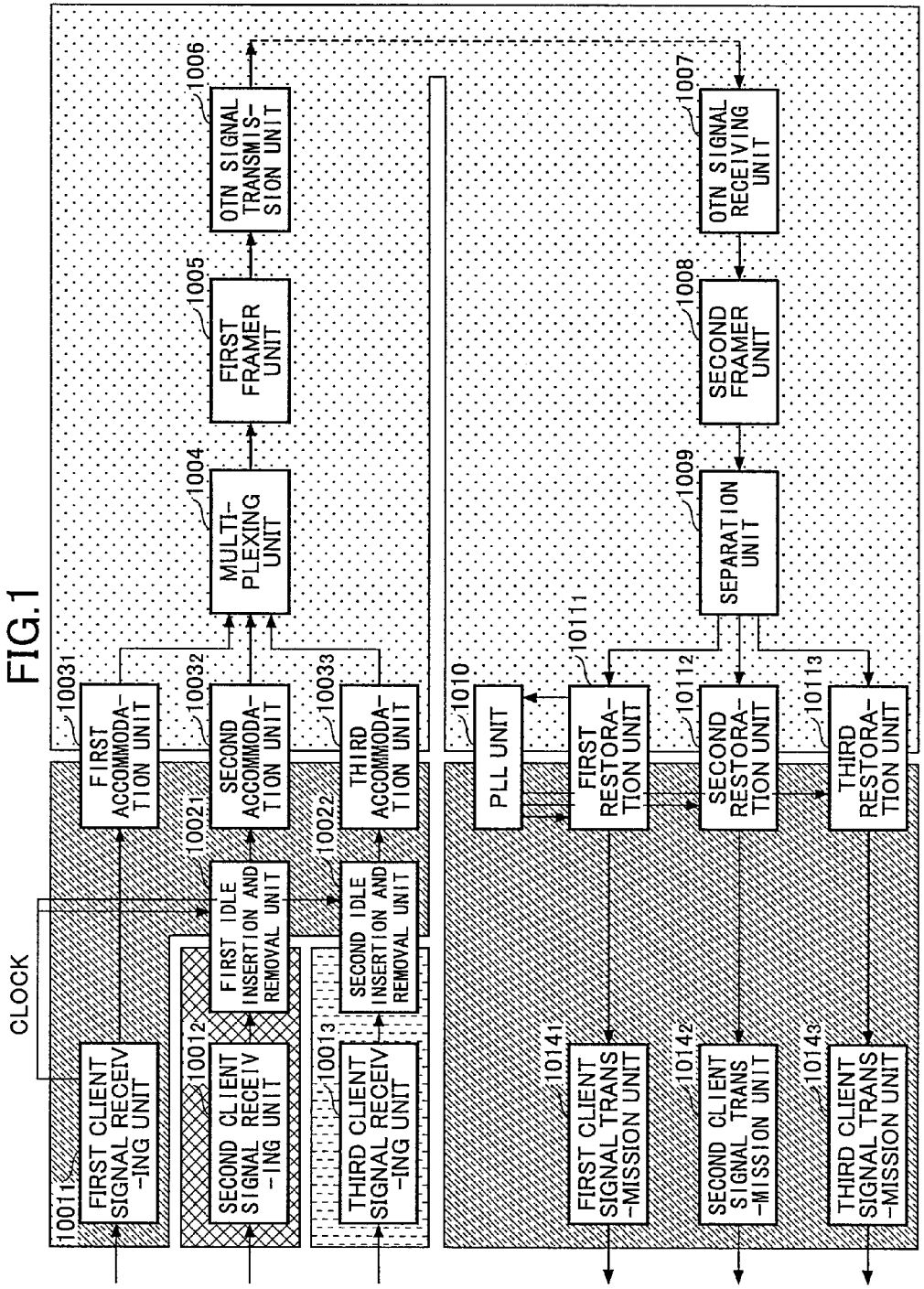
FIG. 1 is a principle block diagram in an embodiment of the present invention.

As shown in FIG. 1, the client signal accommodating and multiplexing apparatus includes:
an OTN apparatus (transmission side) including: client signal receiving units 1001 each of which is configured to receive a client signal; accommodation units 1003 each of which is configured to map the client signal to an ODU signal and maps the ODU signal to an ODTU signal; a multiplexing unit 1004 configured to multiplex a plurality of ODTU signals; a first framer unit 1005 configured to generate an OTU signal; and an OTN signal transmission unit 1006 configured to generate an optical transmission signal, and
an OTN apparatus (receiving side) including: an OTN signal receiving unit 1007 configured to receive an optical transmission signal; a second framer unit 1008 configured to terminate an OTU signal; a separation unit 1009 configured to separate to a plurality of ODTU signals; restoration units 1011 each of which is configured to de-map an ODU signal from the ODTU signal, and to de-map a client signal from the ODU signal; and client signal transmission units 1014 each of which is configured to transmit the restored client signal.

In the client signal accommodating and multiplexing apparatus, in the OTN apparatus (transmission side), an idle insertion and removal unit 1002 is connected between the client signal receiving unit 1001 and the accommodation unit 1003, the idle insertion and removal unit being configured to synchronize client signals by inserting or removing, based on a clock of a first client signal, an idle signal to/from another client signal.

And, in the OTN apparatus (receiving side), a PLL unit 1010 is connected, the PLL unit being configured to recover a clock of the client signal based on clocks and mapping information of the ODTU signal and the ODU signal in a first restoration unit 1011$_1$ and to distribute the clock to the restoration units 1011.

First Embodiment

Figure 2:
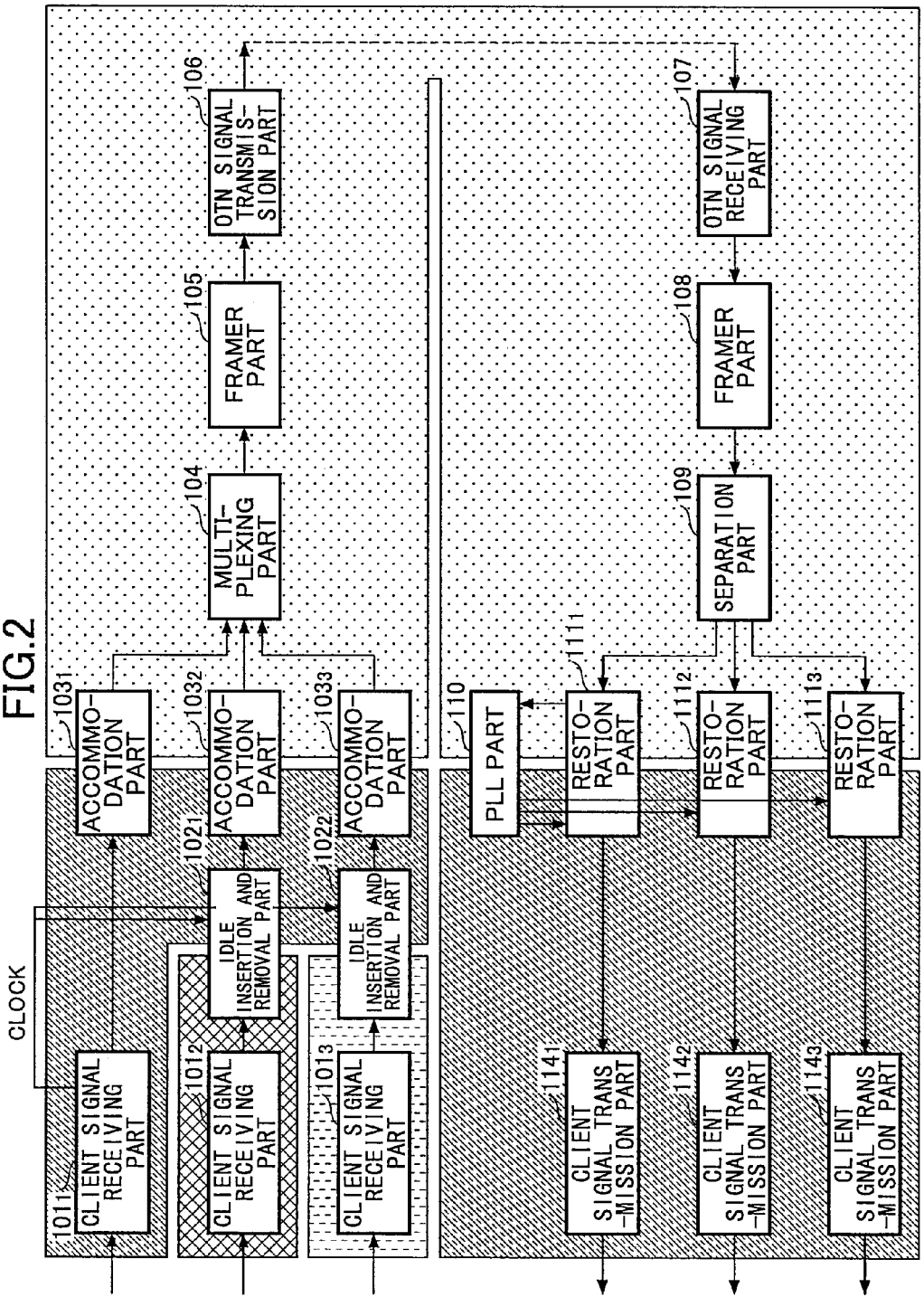
FIG. 2 is a block diagram of a client signal accommodating and multiplexing apparatus in a first embodiment of the present invention.

FIG. 2 shows a configuration of a client signal accommodating and multiplexing apparatus in a first embodiment of the present invention. In the figure, each dashed area indicates one clock domain (each area is operating based on a respective reference oscillator). That is, in the figure, dashed areas indicate independent clock domains respectively.

The client signal accommodating and multiplexing apparatus shown in the figure includes an OTN transmission side (upper part of the figure) and an OTN receiving side (lower part of the figure). The OTN transmission side includes client signal receiving parts 101, idle insertion and removal parts 102, accommodation parts 103, a multiplexing part 104, a framer part 105, and an OTN signal transmission part 106. The OTN receiving side includes an OTN signal receiving part 107, a framer part 108, a separation part 109, a PLL part 110, restoration parts 111, and client signal transmission parts 114.

Each of the client signal receiving parts 101$_1$-101$_3$ receives a client signal, and performs O/E conversion on the client signal. In the configuration of FIG. 2, the client signal receiving part 101$_1$ receives a first client signal, the client signal receiving part 101$_2$ receives a second client signal, and the client signal receiving part $101_3$ receives a third client signal. In these client signal receiving parts, the client signal receiving part $101_1$ recovers a clock, and outputs the clock to the idle insertion and removal parts $102_1$ and $102_2$.

Each of the idle insertion and removal parts $102_1$ and $102_2$ inserts or removes an idle signal to/from another client signal (of client signal receiving part $101_2$, $101_3$) using the clock recovered from the first client signal of the client signal receiving part $101_1$ such that the client signals are synchronized with each other.

The accommodation parts $103_1$-$103_3$ map the synchronized client signals to ODUs respectively, and map ODUs to the ODTU. As concrete examples for mapping, similarly to the conventional technique, BMP, AMP, GMP or the like is used for mapping of the client signal to the ODU, and AMP or GMP or the like is used for mapping of the ODU to the ODTU.

The multiplexing part 104 multiplexes the plurality of ODTUs from the accommodation parts $103_1$-$103_3$ to generate the ODU, and outputs the ODU to the framer part 105.

The framer part 105 generates an OTU signal by performing overhead processing and adding error correction code for the ODU input from the multiplexing part 104.

The OTN signal transmission part 106 generates an optical transmission signal from the OTU signal and transmits the optical transmission signal to the transmission line.

The OTN signal receiving part 107 in the receiving side receives the optical transmission signal and converts the signal into an electrical signal.

The framer part 108 performs termination and decoding of the error correction code for the OTN signal, and transmits the ODU signal to the separation part 109.

The separation part 109 separates the ODU signal to a plurality of ODTU signals and outputs them to the restoration parts $111_1$-$111_3$.

Each of the restoration parts $111_1$-$111_3$ de-maps the ODU signal from the ODTU signal, and further, de-maps the client signal from the ODU signal. The PLL part 110 recovers the clock of the client signal based on clocks and mapping information of the ODTU signal and the ODU signal in the first restoration part $111_1$, so that the PLL part 110 distributes the recovered clock to the restoration parts $111_1$-$111_3$. In the case when AMP is used for mapping, the mapping information indicates contents of JC (Justification Control) bytes defined in the OPU overhead. In the case when GMP is used for mapping, the mapping information indicates contents of $C_m$ or $C_n$ bytes. Since the plurality of client signals are synchronized with each other in the OTN apparatus (in the transmission side), clocks of the ODTU signal and the ODU signal in the first restoration part $111_1$ can be used as mentioned above.

The client signal transmission parts $114_1$-$114_3$ transmit client signals obtained from the restoration parts $111_1$-$111_3$ respectively.

By adopting the above-mentioned configuration, the PLL part 110 can be shared in the OTN apparatus (receiving side), and it becomes possible to largely decrease the number of PLL parts compared to the conventional technique.

For example, in the case when accommodating 80 GbEs into ODU0s respectively, and multiplexing 80×ODU0 into the ODU4 and transferring it, the number of PLL can be decreased from 80 to 1 in the receiving side.

As another example, in the case when accommodating 10 GbEs into ODU2es respectively, and multiplexing 10×ODU2e into the ODU4 and transferring it, the number of PLL can be decreased from 10 to 1 in the receiving side.

Even in the case when a plurality of types of client signals are mixed, if one clock is shared by each type of client signals or if there is a relationship that a ratio of bitrates of the mixed client signals can be represented as a simple fraction, the number of PLL can be decreased by dividing or multiplying the single clock. For example, in the case where 8 GbEs are accommodated in ODU0s respectively, 9 10 GbEs are accommodated ODU2es respectively, and all of them are multiplexed into the ODU4 for transfer, the number of PLLs can be decreased from 17 to 2 by sharing a clock by 8 GbEs and by sharing a clock by 9 10 GnEs in the OTN apparatus (receiving side). Or, since the bitrate of GbE is 1.25 Gb/s and the bitrate of 10 GbE is 10.3125 Gb/s, and relationship of 10.3125=33/4×1.25 holds true between them, the OTN apparatus (receiving side) can be realized by using only one PLL in which, based on one of the clocks of the two types of the client signals, one clock is converted to another clock that is used for another client signal.

In the above description, although a case of client signals multiplexed in a single ODU signal has been described (in the above-mentioned example, GbEs or 10 GbEs multiplexed to a single ODU4), PLL can be also shared among client signals accommodated in a plurality of ODUs. For example, when receiving a plurality of ODU4 signals by wavelength multiplexing transmission, elimination effect of PLL can be further increased by sharing PLL among a plurality of GbEs or a plurality of 10 GbEs that are multiplexed in respective ODU4s.

Also, the client signal to which the present scheme can be applied is not limited to the Ethernet. The present scheme can be also applied to another client signal (fiber channel, for example) that uses a coding format similar to that of the Ethernet, and can be also applied to a client signal in which an idle signal is defined for use of absorption of clock deviation even though coding format is different. Even when these signals are mixed in accommodation, the above-mentioned method can be applied.

Second Embodiment

Figure 3:
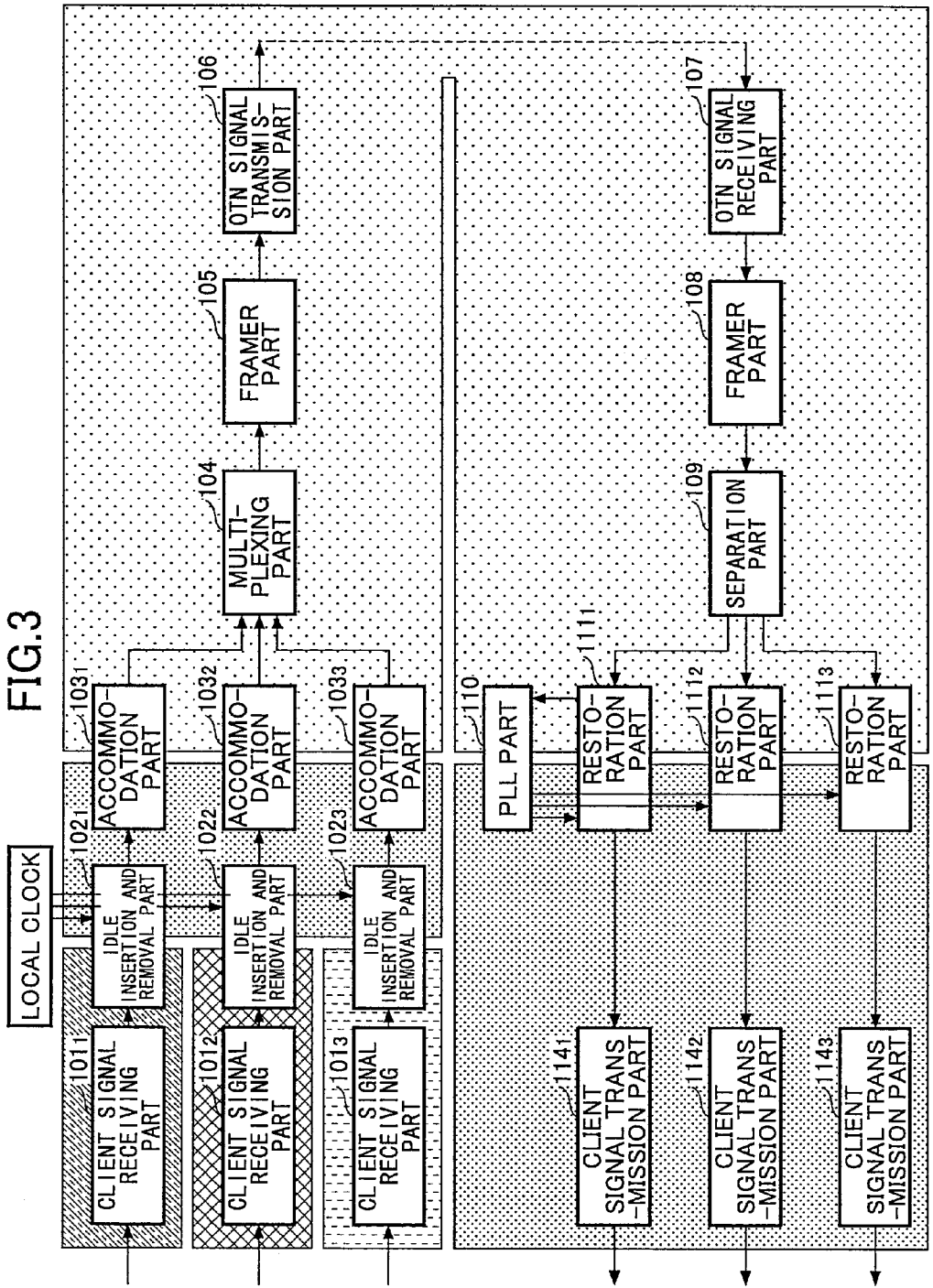
FIG. 3 is a block diagram of a client signal accommodating and multiplexing apparatus in a second embodiment of the present invention.

FIG. 3 shows a configuration of a client signal accommodating and multiplexing apparatus in a second embodiment of the present invention. In the figure, parts the same as those in FIG. 2 are assigned the same reference symbols, and the explanation is not provided. Also in FIG. 3, each dashed area indicates an independent clock domain.

According to the configuration shown in FIG. 3, in the OTN apparatus (transmission side), an idle insertion and removal part ($102_1$-$102_3$) is provided in each interval between the client signal receiving part ($101_1$-$101_3$) and the accommodation part ($103_1$-$103_3$). A local clock is supplied to each of the idle insertion and removal parts $102_1$-$102_3$.

The difference from the first embodiment is that the local clock is used instead of a clock from the first client signal in the OTN apparatus (transmission side). Each of the idle insertion and removal parts ($102_1$-$102_3$) performs insertion and removal of an idle signal of client signals based on the local clock so as to achieve synchronization between client signals. In the first embodiment, the clock is lost if the first client signal is interrupted. On the other hand, such a situation can be avoided by using the local clock in this embodiment.

Third Embodiment

Figure 4:
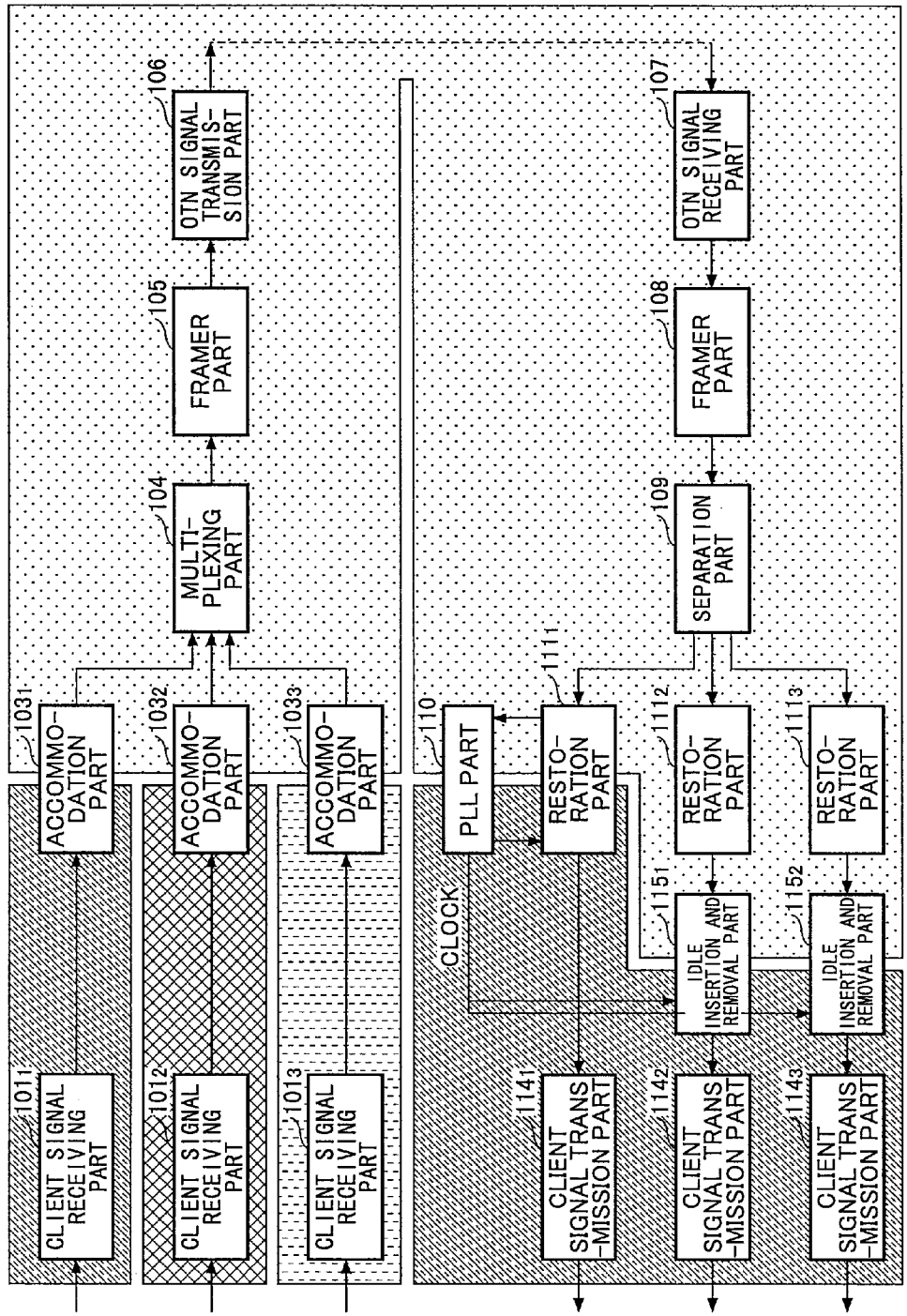
FIG. 4 is a block diagram of a client signal accommodating and multiplexing apparatus in a third embodiment of the present invention.

FIG. 4 shows a configuration of a client signal accommodating and multiplexing apparatus in a third embodiment of the present invention. In the figure, parts the same as those in FIG. 2 are assigned the same reference symbols, and the explanation is not provided. Also in FIG. 4, each dashed area indicates an independent clock domain.

Figure 6:
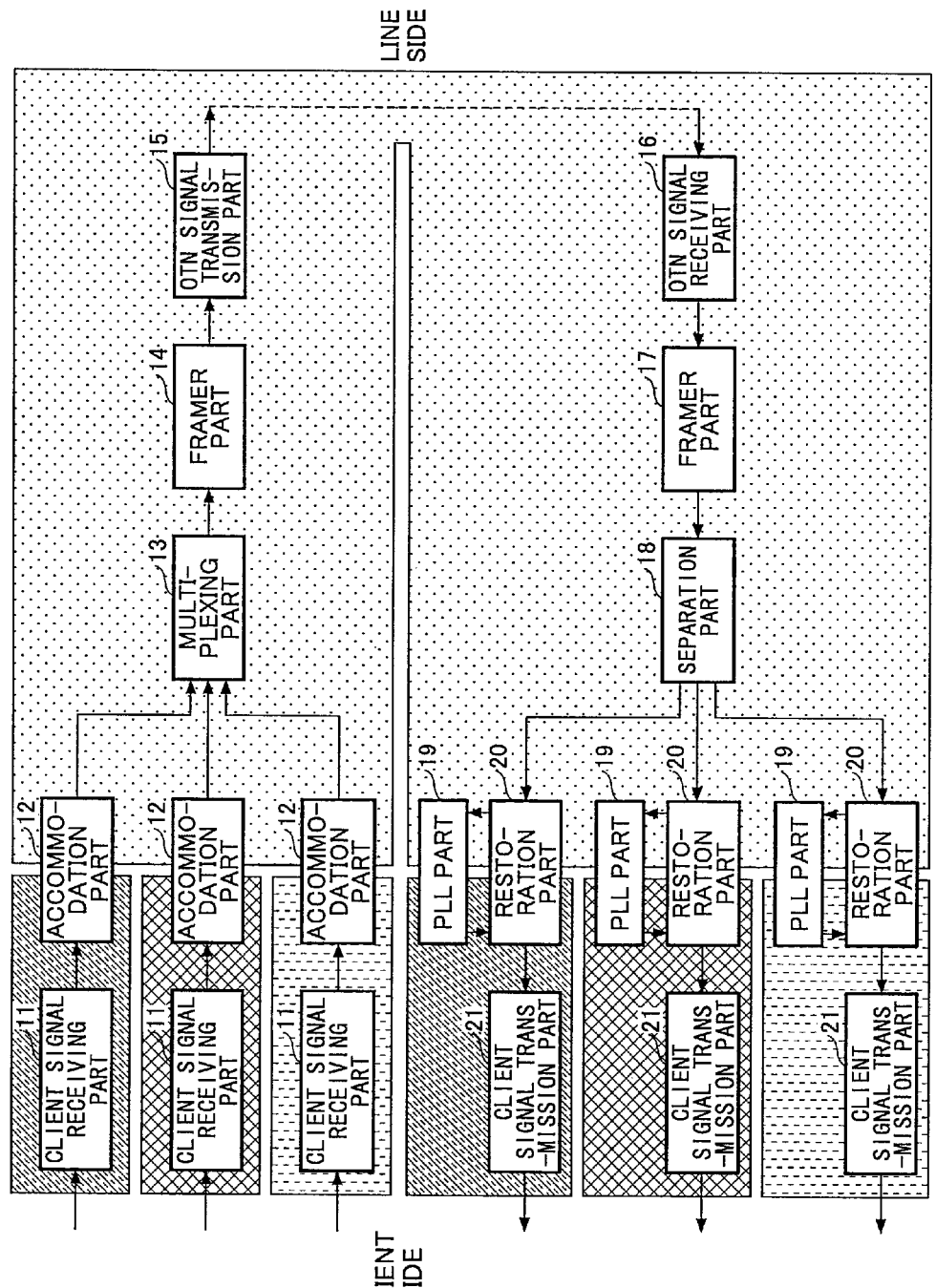
FIG. 6 is a block diagram of a conventional client signal accommodating and multiplexing apparatus.

The configuration of the transmission side shown in FIG. 4 is the same as the configuration of the conventional technique shown in FIG. 6. In the receiving side, an idle insertion and removal part $115_1$ is provided between the second restoration part $111_2$ and the second client signal transmission part $114_2$, and an idle insertion and removal part $115_2$ is provided between the third restoration part $111_3$ and the third client signal transmission part $114_3$. Each of the idle insertion and removal parts $115_1$ and $115_2$ receives a clock from the PLL part 110 so as to synchronize the client signals with each other by inserting or removing an idle signal into/from the client signals.

Each of the client signal receiving parts $101_1$-$101_3$ in the transmission side receives a client signal, and performs O/E conversion on the client signal.

Each of the accommodation parts $103_1$-$103_3$ maps the client signal to the ODU, and maps the ODU to the ODTU.

The multiplexing part 104 multiplexes the plurality of ODTUs output from each of the accommodation parts $103_1$-$103_3$ to generate the ODU, and outputs the ODU to the framer part 105.

The framer part 105 generates an OTU signal by performing overhead processing and adding error correction code for the ODU obtained from the multiplexing part 104.

The OTN signal transmission part 106 generates an optical transmission signal from the OTU signal obtained from the framer part 105 and transmits the optical transmission signal to the transmission line.

The OTN signal receiving part 107 in the receiving side receives the optical transmission signal and converts the signal into an electrical signal.

The framer part 108 performs termination and decoding of the error correction code for the OTN signal, and transmits the ODU signal to the separation part 109.

The separation part 109 separates the ODU signal to a plurality of ODTU signals and outputs them to the restoration parts $111_1$-$111_3$.

Each of the restoration parts $111_1$-$111_3$ de-maps the ODU signal from the ODTU signal, and further, de-maps the client signal from the ODU signal. The PLL part 110 recovers the clock of the client signal based on clocks and mapping information of the ODTU signal and the ODU signal in the first restoration part $111_1$, so that the PLL part 110 distributes the clock to the first restoration part $111_1$ and to the idle insertion and removal parts $115_1$ and $115_2$ that are placed after the other restoration parts $111_2$ and $111_3$.

Each of the idle insertion and removal parts $115_1$ and $115_2$ inserts or removes an idle signal to/from each client signal by using the clock signal recovered by the PLL part 110 in order to synchronize the client signals.

After that, each of the client signal transmission parts $114_1$-$114_3$ transmits the client signal.

By adopting the above-mentioned configuration, the number of the PLL parts can be largely decreased in the OTN apparatus (receiving side).

Fourth Embodiment

Figure 5:
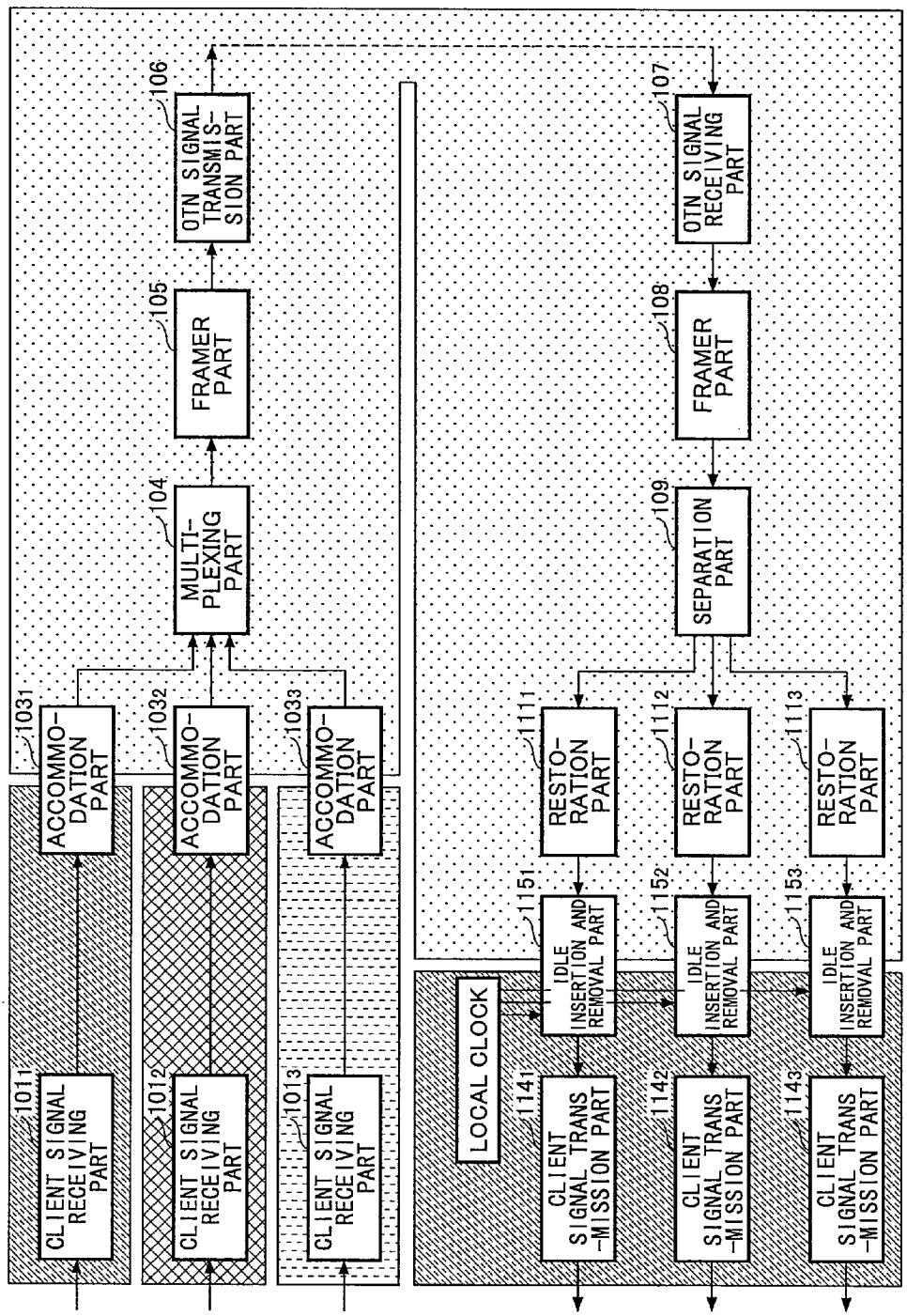
FIG. 5 is a block diagram of a client signal accommodating and multiplexing apparatus in a fourth embodiment of the present invention.

FIG. 5 shows a configuration of a client signal accommodating and multiplexing apparatus in a fourth embodiment of the present invention. In the figure, parts the same as those in FIG. 2 are assigned the same reference symbols, and the explanation is not provided. Also in FIG. 5, each dashed area indicates an independent clock domain.

The configuration of the OTN apparatus (receiving side) in FIG. 5 is different from the configuration shown in FIG. 4 in that the idle insertion and removal parts $115_1$-$115_3$ are provided between the restoration parts $111_1$-$111_3$ and the client signal transmission parts $114_1$-$114_3$ respectively.

The difference from the third embodiment is that a local clock is used instead of using a clock generated by the PLL part 110 based on the clock and mapping information of the ODTU signal and the ODU signal in the first restoration part $111_1$ in the OTN apparatus (receiving side). Each of the idle insertion and removal parts $115_1$-$115_3$ performs insertion or removal of an idle signal for the client signals received from the restoration parts $111_1$-$111_3$ based on the local clock so as to achieve synchronization between client signals.

In the third embodiment, the clock is lost if the first ODU signal is interrupted. On the other hand, such a situation can be avoided by using the local clock in the fourth embodiment.

The present invention is not limited to the specifically disclosed embodiments, and variations and modifications may be made without departing from the scope of the claims.

INDUSTRIAL APPLICABILITY

The present invention can be also applied to a client signal such as the fiber channel that uses a coding format similar to that of the Ethernet, and can be also applied to a client signal in which an idle signal is defined for use of absorption of clock deviation and the like even though the coding format is different. Even when these signals are mixed in accommodation, the above-mentioned method can be applied.

The present international application claims priority based on Japanese patent application No. 2010-056269 filed on Mar. 12, 2010 and the entire contents of the application No. 2010-056269 are incorporated herein by reference.

DESCRIPTION OF REFERENCE SIGNS $101_1$ client signal receiving part
$101_2$ client signal receiving part
$101_3$ client signal receiving part
$102_1$ idle insertion and removal part
$102_2$ idle insertion and removal part
$102_3$ idle insertion and removal part
$103_1$ accommodation part
$103_2$ accommodation part
$103_3$ accommodation part
104 multiplexing part
105 framer part
106 OTN signal transmission part
107 OTN signal receiving part
108 framer part
109 separation part
110 PLL part
$111_1$ restoration part
$111_2$ restoration part
$111_3$ restoration part
$114_1$ client signal transmission part
$114_2$ client signal transmission part
$114_3$ client signal transmission part
$115_1$ idle insertion and removal part
$115_2$ idle insertion and removal part
$115_3$ idle insertion and removal part
$1001_1$ first client signal receiving unit
$1001_2$ second client signal receiving unit
$1001_3$ third client signal receiving unit
$1002_1$ first idle insertion and removal unit
$1002_2$ second idle insertion and removal unit $1002_3$ third idle insertion and removal unit
$1003_1$ first accommodation unit
$1003_2$ second accommodation unit
$1003_3$ third accommodation unit
1004 multiplexing unit
1005 first framer unit
1006 OTN signal transmission unit
1007 OTN signal receiving unit
1008 second framer unit
1009 separation unit
1010 PLL unit
$1011_1$ first restoration unit
$1011_2$ second restoration unit
$1011_3$ third restoration unit
$1014_1$ first client signal transmission unit
$1014_2$ second client signal transmission unit
$1014_3$ third client signal transmission unit
$1015_1$ first idle insertion and removal unit
$1015_2$ second idle insertion and removal unit

The invention claimed is:

1. A client signal accommodating and multiplexing apparatus comprising:
a transmission side OTN (optical transport network) apparatus that comprises:
client signal receiving units each of which is configured to receive a client signal;
accommodation units each of which is configured to map the client signal to an ODU (optical channel data unit) signal and maps the ODU signal to an ODTU (optical channel data tributary unit) signal;
a multiplexing unit configured to multiplex a plurality of ODTU signals;
a first framer unit configured to generate an OTU (optical channel transport unit) signal; and
an OTN signal transmission unit configured to generate an optical transmission signal; and
a receiving side OTN apparatus that comprises:
an OTN signal receiving unit configured to receive an optical transmission signal;
a second framer unit configured to terminate an OTU signal;
a separation unit configured to separate to a plurality of ODTU signals;
restoration units each of which is configured to de-map an ODU signal from the ODTU signal, and to de-map a client signal from the ODU signal; and
client signal transmission units each of which is configured to transmit the de-mapped client signal, wherein
in the transmission side OTN apparatus, an idle insertion and removal unit is connected between the client signal receiving unit and the accommodation unit, the idle insertion and removal unit being configured to synchronize client signals by inserting or removing, based on a clock of a first client signal, an idle signal to/from another client signal, and
in the receiving side OTN apparatus, a PLL (Phase Locked Loop) unit is connected, the PLL unit being configured to recover a clock of the client signal based on clocks and mapping information of the ODTU signal and the ODU signal in a first restoration unit and to distribute the clock to the restoration units.

2. A client signal accommodating and multiplexing apparatus comprising:
a transmission side OTN (optical transport network) apparatus that comprises:
client signal receiving units each of which is configured to receive a client signal;
accommodation units each of which is configured to map the client signal to an ODU (optical channel data unit) signal and maps the ODU signal to an ODTU (optical channel data tributary unit) signal;
a multiplexing unit configured to multiplex a plurality of ODTU signals;
a first framer unit configured to generate an OTU (optical channel transport unit) signal; and
an OTN signal transmission unit configured to generate an optical transmission signal; and
a receiving side OTN apparatus that comprises:
an OTN signal receiving unit configured to receive an optical transmission signal;
a second framer unit configured to terminate an OTU signal;
a separation unit configured to separate to a plurality of ODTU signals;
restoration units each of which is configured to de-map an ODU signal from the ODTU signal, and to de-map a client signal from the ODU signal; and
client signal transmission units each of which is configured to transmit the de-mapped client signal, wherein
in the transmission side OTN apparatus, an idle insertion and removal unit is connected between the client signal receiving unit and the accommodation unit, the idle insertion and removal unit being configured to synchronize client signals by inserting or removing an idle signal to/from the client signals based on a local clock and a clock output from the local clock, and
in the receiving side OTN apparatus, a PLL (Phase Locked Loop) unit is connected, the PLL unit being configured to recover a clock of the client signal based on clocks and mapping information of the ODTU signal and the ODU signal in a first restoration unit and to distribute the clock to the restoration units.

3. A client signal accommodating and multiplexing apparatus comprising:
a transmission side OTN (optical transport network) apparatus that comprises:
client signal receiving units each of which is configured to receive a client signal;
accommodation units each of which is configured to map the client signal to an ODU (optical channel data unit) signal and maps the ODU signal to an ODTU (optical channel data tributary unit) signal;
a multiplexing unit configured to multiplex a plurality of ODTU signals;
a first framer unit configured to generate an OTU (optical channel transport unit) signal; and
an OTN signal transmission unit configured to generate an optical transmission signal; and
a receiving side OTN apparatus that comprises:
an OTN signal receiving unit configured to receive an optical transmission signal;
a second framer unit configured to terminate an OTU signal;
a separation unit configured to separate to a plurality of ODTU signals;
restoration units each of which is configured to de-map an ODU signal from the ODTU signal, and to de-map a client signal from the ODU signal; and
client signal transmission units each of which is configured to transmit the de-mapped client signal, wherein
in the receiving side OTN apparatus, a PLL (Phase Locked Loop) unit is connected, the PLL unit being configured to recover a clock of the client signal based on clocks and mapping information of the ODTU signal and the ODU signal in a first restoration unit and, to distribute the clock to the first restoration unit and to an idle insertion and removal unit that is placed after the other restoration units, the idle insertion and removal unit being configured to synchronize client signals by inserting or removing an idle signal to/from the client signals.

4. A client signal accommodating and multiplexing apparatus comprising:
a transmission side OTN (optical transport network) apparatus that comprises:
client signal receiving units each of which is configured to receive a client signal of a plurality of client signals;
accommodation units each of which is configured to map the client signal to an ODU (optical channel data unit) signal and maps the ODU signal to an ODTU (optical channel data tributary unit) signal;
a multiplexing unit configured to multiplex a plurality of ODTU signals to generate an ODU signal;
a first framer unit configured to generate an OTU (optical channel transport unit) signal from the ODU signal generated by the multiplexing unit; and
an OTN signal transmission unit configured to generate an OTN signal from the OTU signal generated by the first framer unit and to transmit the OTN signal to a transmission route; and
a receiving side OTN apparatus that comprises:
an OTN signal receiving unit configured to receive the OTN signal from the transmission route;
a second framer unit configured to terminate the OTN signal received by the OTN signal receiving unit and to generate an ODU signal;
a separation unit configured to separate the ODU signal generated by the second framer unit to a plurality of ODTU signals;
restoration units each of which is configured to de-map an ODU signal from an ODTU signal of the plurality of ODTU signals separated by the separation unit, and to de-map a client signal from the ODU signal; and
client signal transmission units each of which is configured to transmit a client signal of a plurality of client signals de-mapped by the restoration units, wherein
the receiving side OTN apparatus includes idle insertion and removal units each of which is connected right after a restoration unit of the restoration units, and includes a local clock unit, and
the idle insertion and removal units are configured to synchronize the plurality of client signals by inserting an idle signal to an input client signal or by removing an idle signal from an input client signal based on a clock output from the local clock unit.

5. A client signal accommodating and multiplexing method comprising:
in a transmission side OTN (optical transport network) apparatus:
receiving a client signal;
mapping the client signal to an ODU (optical channel data unit) signal and mapping the ODU signal to an ODTU (optical channel data tributary unit) signal;
multiplexing a plurality of ODTU signals;
generating an OTU (optical channel transport unit) signal; and
generating an optical transmission signal;
in a receiving side OTN apparatus:
receiving an optical transmission signal;
terminating an OTU signal;
separating a plurality of ODTU signals;
de-mapping an ODU signal from the ODTU signal, and de-mapping a client signal from the ODU signal; and transmitting the de-mapped client signal;
in the transmission side OTN apparatus, removal synchronizing client signals by inserting, based on a clock of a first client signal, an idle signal to another client signal or by removing, based on the clock of the first client signal, the idle signal from the other client signal; and
in the receiving side OTN apparatus, recovering a clock of the client signal based on clocks, mapping information of the ODTU signal and the ODU signal, and distributing the clock.

6. A client signal accommodating and multiplexing method comprising:
in a transmission side OTN (optical transport network) apparatus:
receiving a client signal;
mapping the client signal to an ODU (optical channel data unit) signal and mapping the ODU signal to an ODTU (optical channel data tributary unit) signal;
multiplexing a plurality of ODTU signals;
generating an OTU (optical channel transport unit) signal; and
generating an optical transmission signal;
in a receiving side OTN apparatus:
receiving an optical transmission signal;
terminating an OTU signal;
separating a plurality of ODTU signals;
de-mapping an ODU signal from the ODTU signal, and de-mapping a client signal from the ODU signal; and transmitting the de-mapped client signal;
in the transmission side OTN apparatus, synchronizing client signals by inserting, based on a local clock and a clock output from the local clock, an idle signal to the client signals, or by removing the idle signal from the client signals based on the local clock and the clock output from the local clock, and
in the receiving side OTN apparatus, recovering the clock of the client signal based on clocks and mapping information of the ODTU signal and the ODU signal.

7. A client signal accommodating and multiplexing method comprising:
in a transmission side OTN (optical transport network) apparatus:
receiving a client signal;
mapping the client signal to an ODU (optical channel data unit) signal and mapping the ODU signal to an ODTU (optical channel data tributary unit) signal;
multiplexing a plurality of ODTU signals;
generating an OTU (optical channel transport unit) signal; and
generating an optical transmission signal;
in a receiving side OTN apparatus:
receiving an optical transmission signal;
terminating an OTU signal;
separating a plurality of ODTU signals;
de-mapping an ODU signal from the ODTU signal, and de-mapping a client signal from the ODU signal; and transmitting the de-mapped client signal;
in the receiving side OTN apparatus, recovering a clock of the client signal based on clocks and mapping information of the ODTU signal and the ODU signal, distributing the clock, and synchronizing client signals by inserting an idle signal to the client signals using the clock or by removing the idle signal from the client signals using the clock.

8. A client signal accommodating and multiplexing method comprising:
in a transmission side OTN (optical transport network) apparatus:
receiving a client signal of a plurality of clock signals;
mapping the client signal to an ODU (optical channel data unit) signal and mapping the ODU signal to an ODTU (optical channel data tributary unit) signal;
multiplexing a plurality of ODTU signals to generate an ODU signal;
generating an OTU (optical channel transport unit) signal from the generated ODU signal; and
generating an OTN signal from the generated OTU signal and transmitting the OTN signal to a transmission route; and
in a receiving side OTN apparatus:
receiving the OTN signal from the transmission route;
terminating the received OTN signal and generating an ODU signal;
separating the generated ODU signal to a plurality of ODTU signals;
de-mapping an ODU signal from an ODTU signal of the plurality of separated ODTU signals, and de-mapping a client signal from the ODU signal; and
transmitting a client signal of a plurality of de-mapped client signals
in the receiving side OTN apparatus, synchronizing the plurality of client signals by inserting an idle signal to an input client signal or by removing an idle signal from an input client signal based on a clock output from a local clock unit.

* * * * *